(12) United States Patent
Szutu

(10) Patent No.: US 7,882,804 B2
(45) Date of Patent: Feb. 8, 2011

(54) PET FOOD DISPENSER

(76) Inventor: Hui Jen Szutu, 1022 S. Gladys Ave., San Gabriel, CA (US) 91776

( * ) Notice: Subject to any disclaimer, the term of this patent is extended or adjusted under 35 U.S.C. 154(b) by 0 days.

(21) Appl. No.: 11/974,741

(22) Filed: Oct. 15, 2007

(65) Prior Publication Data

US 2009/0095223 A1    Apr. 16, 2009

(51) Int. Cl.
*A01K 5/02* (2006.01)
(52) U.S. Cl. .................................. 119/51.02; 119/51.11
(58) Field of Classification Search ............... 119/51.01, 119/51.02, 51.04, 51.11, 51.12, 51.14, 51.5, 119/52.1, 53, 56.1, 57.1, 57.92, 72, 74, 78, 119/79, 80; 177/64
See application file for complete search history.

(56) References Cited

U.S. PATENT DOCUMENTS

| 3,196,835 | A | * | 7/1965 | Bergevin | 119/51.11 |
| 4,722,300 | A | * | 2/1988 | Walker et al. | 119/51.11 |
| 5,433,171 | A | * | 7/1995 | Ewell | 119/51.5 |
| 6,145,472 | A | * | 11/2000 | Vittuari et al. | 119/51.5 |
| 7,082,971 | B2 | * | 8/2006 | Gauthier | 141/198 |

* cited by examiner

*Primary Examiner*—T. Nguyen
(74) *Attorney, Agent, or Firm*—David A Balasco

(57) ABSTRACT

This invention is a water and pet food dispenser equipped with a non-power consumption water dispenser and a power consumption pet food dispenser. The water dispenser siphons water from a storage container to a water feeding bowl. Pet food is dispensed from a storage container by vibration, utilizing the weight and time sensing components to control pet food to be dispensed in the exact quantity at the exact time as predetermined. The exact quantity is monitored by a weighing scale and the exact time is controlled by a timer. The feeding cycle repeats as soon as the electrical timer turns on electrical power supply.

4 Claims, 3 Drawing Sheets

PET FOOD DISPENSER

BACKGROUND OF THE INVENTION (1) Field of the Invention

This invention relates to an automatic pet feeder. Specifically, the present invention is a water and pet food feeding machine, which provides water to a feeding bowl maintaining a constant water level, also it dispenses pet food on a set time interval at a predetermined quantity.

(2) Description of the Related Art

Oftentimes, we are away from home for work, school, or vacation. We do not spend enough time at home, which leads to neglect on our pets. If we are not home for a few days, then we can not feed our pets for a few days, our pets suffer from dehydration and hunger. Leaving excessive pet food does not solve this problem, because the unconsumed pet food spoils quickly. If we want to own pets, the least we can do is to feed them right, the right quantity at the right time. This is the basic requirement which can be an unbearable burden to many of us. The present invention will decrease this burden by feeding water and pet food to our pets for weeks at a predetermined quantity on a set time interval.

It is difficult to come by a reliable machine to feed our pets in a proper output. As the prior art, U.S. Pat. No. 5,003,925 to Robert John D, is a Fish Food Dispenser. The dry pet food is dispensed with half-cup scoop in the production line. The minimum serving for each dispense was half a cup with increments of half cup. In other words, the servings could only be ½, 1, 1½, 2 cup and so on with no other measurements in between. In real practice, the half cup increment of fish food will most likely miss the target badly for the desired quantity. The set quantity for dispensing controlled by the number of scoop of half a cup suffers significantly from inaccurate dispensing.

The feeding output monitored by a number of scoops has a similar inaccurate dispensing effect as the other methods that the feeding outputs monitored by the number of revolutions or the duration time for dispensing. As illustrated in U.S. Pat. No. 6,681,718, an Animal Feeding Device from McIlarky, Scott Alan. "The urging member rotates for a duration or number of revolutions commensurate to the desired quantity of food to be dispensed at each feeding interval." This device depends solely on the dispensing time or the number of revolutions to control the quantity of pet food to be dispensed. These are the unreliable trial and error methods. For every setting, multiple guesses are most likely taking places to make certain the outputs from the number of revolution or a dispensing time that may closely match the desired quantity. In such manner, it is difficult to dispense pet food to the exact desired outputs. This method cannot even maintain a constant feeding output at the same setting due to any tiny change of the dispensing condition.

Development of a device which can provide a predetermined weight of food to a pet at a predetermined time without the need for a feeding bowl represents a great improvement in the field of pet feeding and satisfies a long felt need of the pet owner.

SUMMARY OF THE INVENTION

One object of the invention is to provide a dispenser that would be able to provide water and food for all the pets in our care, including dogs, cats, fish, birds, as long as the dispensed pet food is in a granular dry form.

Another object of the invention is to provide a regular feeding time schedule for our pets. Our pets are fed on a set time of our desired. We do not need to be present when we are feeding our pets. Even if we are going away from our pets for a vacation, the present invention will feed our pets for weeks regularly until the storage containers become empty.

A further object of the invention is to provide a dispenser that feeds our pets in the precise amount of pet food as predetermined. A mechanical scale of the present invention can be set to any amount of pet food to be dispensed. Our pets will receive many health benefits from the correct persistent feeding.

This invention is a pet food dispensing apparatus. It has a storage container for holding pet food with an adjustable hole near its base; a downward sloping ramp with its proximal end affixed to the storage container below the adjustable hole; a catch bowl, without a bottom, positioned below the distal end of the ramp; an adjustable scale, having a weighing pan, a fulcrum, a measuring arm and a poise below the catch bowl; an electrical vibrator attached to the storage container; an activator near the fulcrum and below the measuring arm; a three way switch further from the fulcrum and below the measuring arm; and an electrical timer providing electrical current to the three way switch at a preset time for a preset interval.

The weighing pan is directly below the catch bowl and functions as a separable bottom for the catch bowl. When energized the activator pushes the weighing arm up. Then the catch bowl and weighing pan are moved from a position in contact with each other to a position separated from each other. The three way switch energizes the vibrator when the measuring arm is close to the three way switch and the three way switch energizes the activator when the measuring arm is not close to the three way switch. The three way switch may be mechanically, magnetically or proximity activated.

To operate this invention, the electrical timer is set to provide current to the three way switch at a preset time for a preset interval and the poise is set on the measuring arm to deliver a pre-determined weight of pet food. When the electrical timer first turns on the current to the invention, current flows to the three way switch. Then the vibrator vibrates and pet food is thereby caused to flow out of the hole in the container, down the ramp and into the bowl. When the weight of pet food in the bowl reaches the pre-determined weight the measuring arm pivots upwards causing current to cease flowing through the vibrator thus stopping the vibration and pet food flow. Then current flows through the activator which causes the activator to push upwards on the measuring arm and the bowl to separate from the weighing pan.

In summary this invention causing a predetermined weight of pet food to flow from a container into a bowl at a predetermined time by vibration; and then causes the pet food to spill from the bowl when the weight of pet food in the bowl reaches the predetermined weight.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

While the present invention is described herein with reference to illustrative embodiments for particular applications, it should be understood that the invention is not limited thereto.

Those having ordinary skill in the art and access to the teachings provided herein will recognize additional modifications, applications, and embodiments within the scope thereof and additional fields in which the present invention would be of significant utility.

Figure 1:
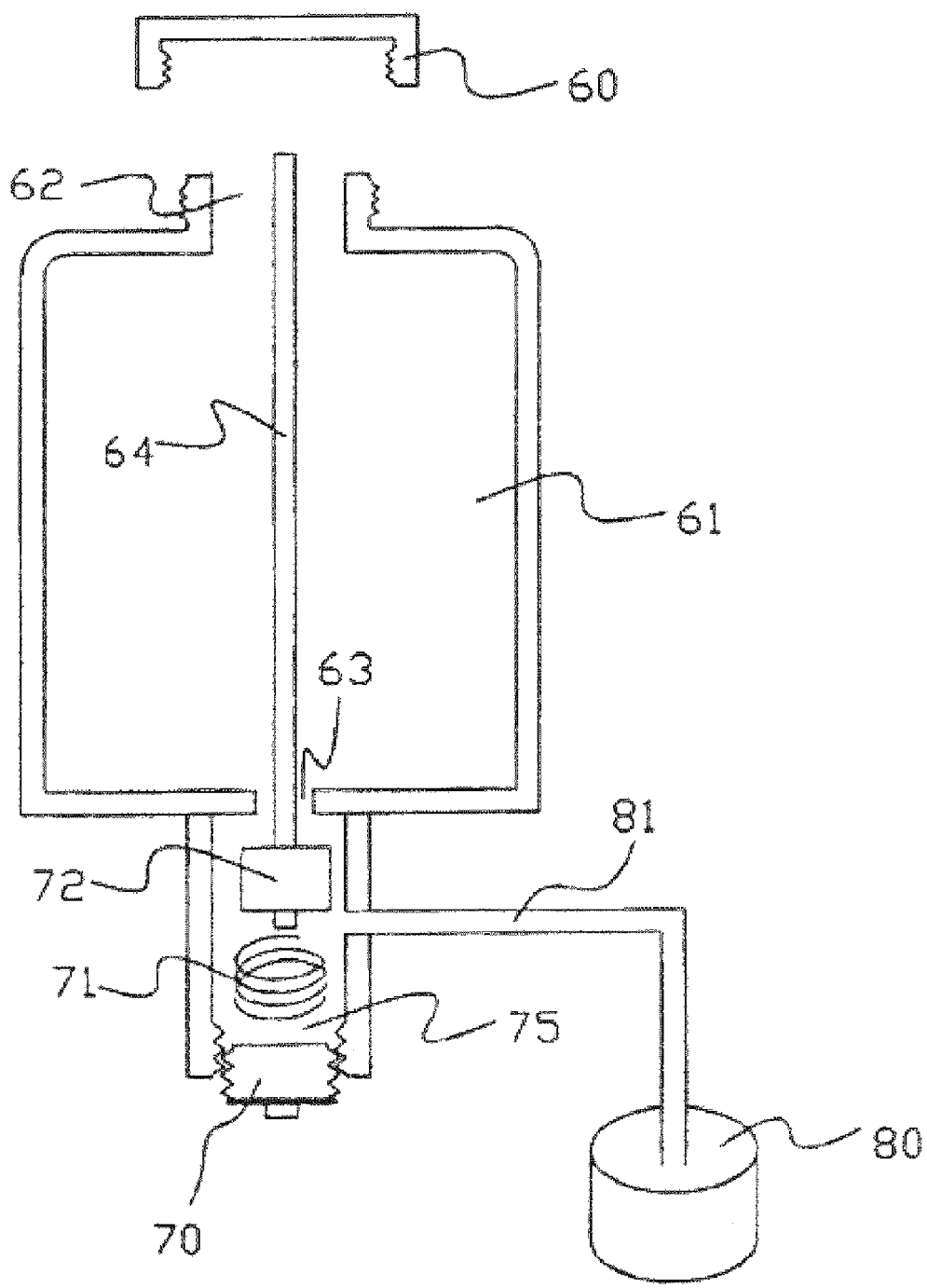
FIG. 1 is a perspective view of the comprising mechanical components for water dispensing

No electrical power is required for the water dispenser of the present invention. Water is siphoned from a water storage container at a high point to the feeding bowl located below. Referring to the drawing of FIG. 1, the replenishment of water is stored in the container 61. Water fills into the storage container 61 from the mouth 62. When the cap 60 is open, the spring 71 is able to push the washer 72 up to close the dispensing opening 63. The dispensing opening 63 is located at the center of the bottom of the storage container 61. No water can flow out from the storage container 61 when the cap 60 is opened because the spring 71 freely extends to push the washer 72 to the dispensing opening 63 to close the said opening 63. The cap 60 is mainly opened for water refilling to the storage container 61. It is essential that there is no water flow out from the storage container 61 to the bowl 80 during refill.

When the cap 60 is closed, the mouth 62 is sealed. This creates a leak-free siphon-able system for the storage container 61 with only one opening path to the bowl 80. Closing the cap 60, the said cap pushes down the washer rod 64 which directly pushes down the washer 72, compressing the spring 71, opening the dispensing opening 63. The water can flow out from the storage container 61 through the dispensing opening 63, the washer housing 75, the siphon tubing 81, where it finally arrives at the bowl 80 to be served.

While the water flows out from the storage container 61, the outside air enters the storage container 61 from the reverse direction of the above mentioned water flow. The air goes inside the storage container 61 to maintain the atmospheric pressure inside said container 61, which is required the atmospheric pressure to continue the water flow. The air goes into the storage container 61 while the water flows out from the storage container 61, this process taking place until the water level in the bowl 80 raises to submerge the tip of the siphon tubing 81. At this point, the only opening path to the storage container 61 is sealed by water, thus air is unable to go to the inside of the storage container 61. Gravity tends to draw the water down, creating a partial vacuum inside the storage container 61. Water stops flowing out from the water storage container 61 since there is negative atmospheric pressure inside said container 61.

Water starts flowing again from the water storage container 61 to the water feeding bowl 80 as soon as the water level in the bowl 80 goes below the tip of the siphon tubing 81. The outside air is now able to go through the siphon tubing 81, then to the storage container 61. Once again the atmospheric pressure is re-established inside the said container 61. Under this atmospheric pressure, water is allowed to flow to the bowl 80 again.

The removable portion 70 of the washer housing 75 is required to have a leak-free installation. It provides a service access to the washer housing 75 for future maintenance.

Figure 2:
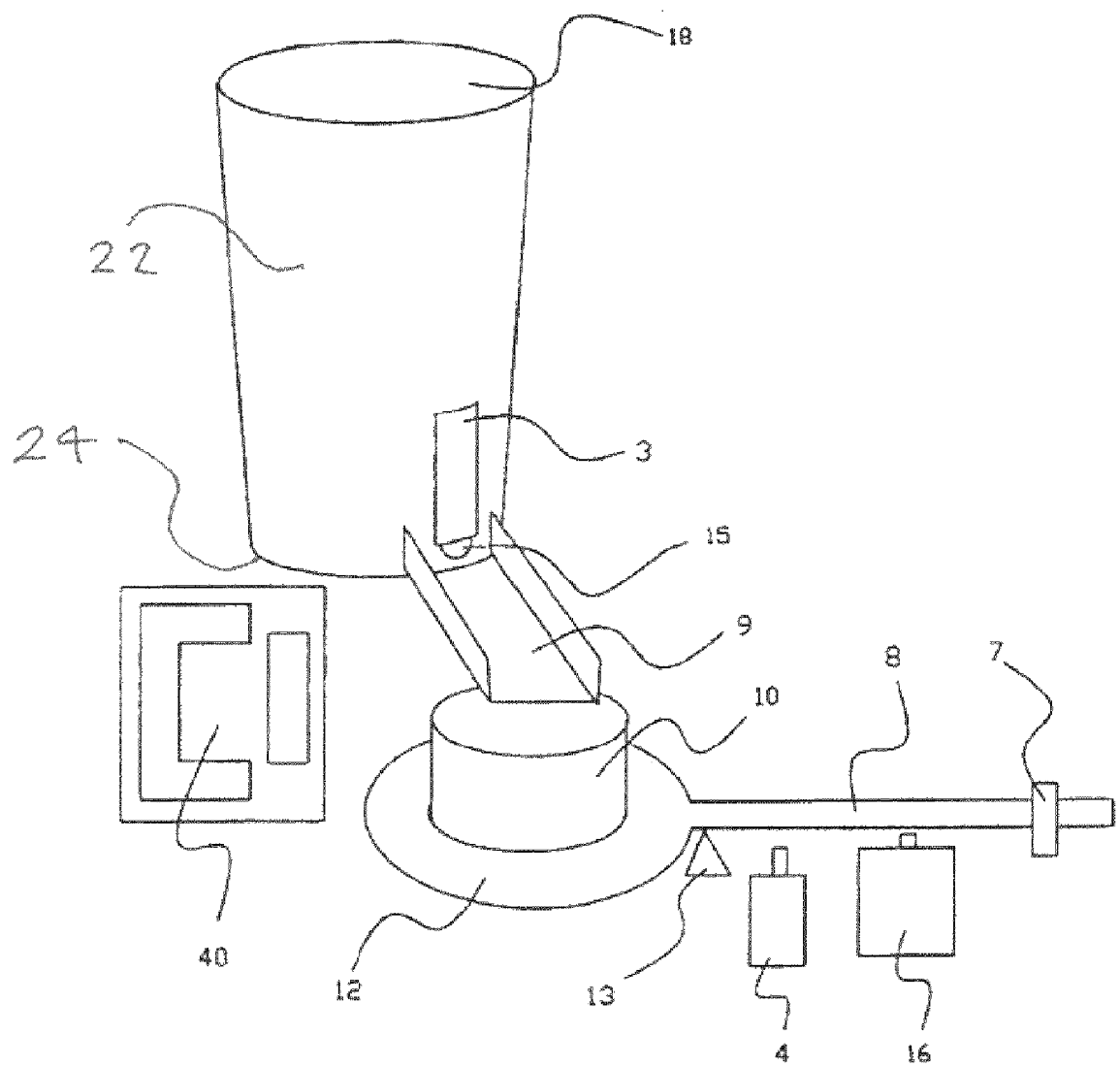
FIG. 2 is a perspective view of the comprising mechanical components incorporating the pet food dispensing
Figure 3:
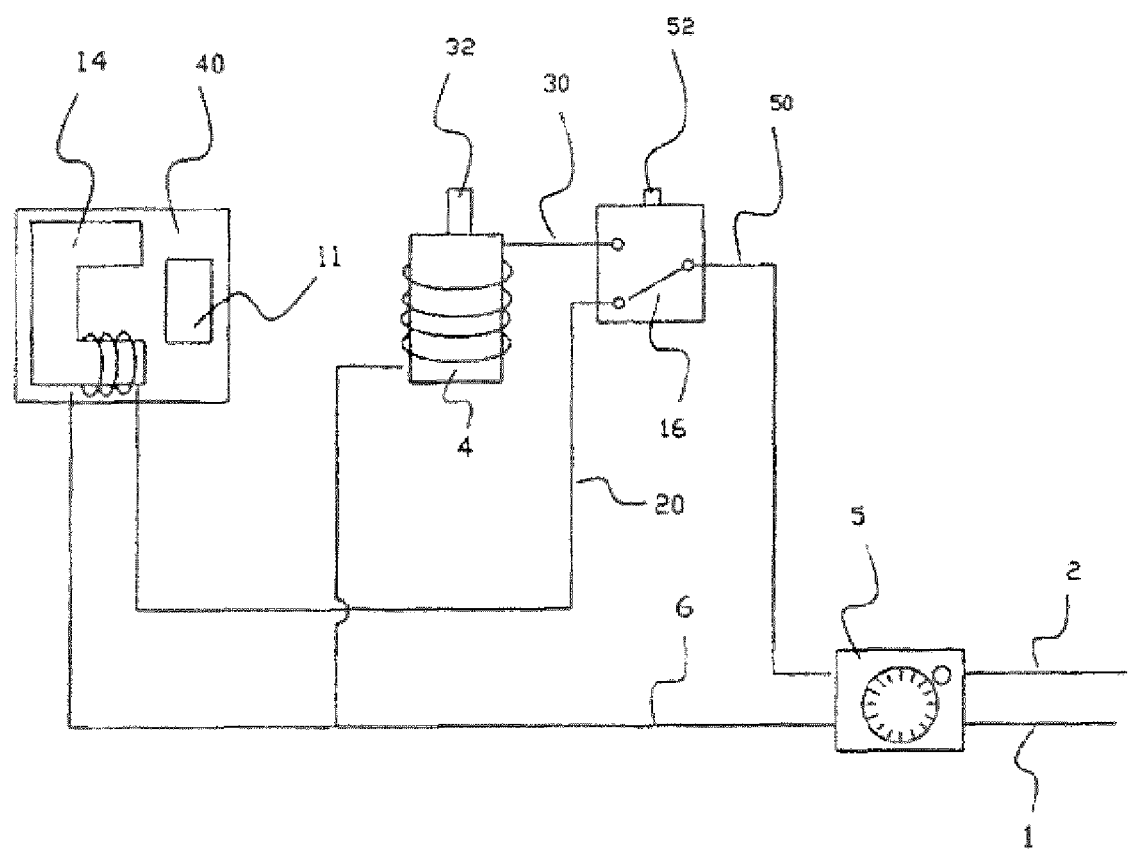
FIG. 3 is the electrical schematic diagram of the pet food dispensing

Referring to the drawing of FIG. 2 and FIG. 3 for pet food dispensing, the dry granular pet food is placed in the storage container, 18. There is a hole 15 located in the side wall 22 at the base 24 of the said container 18. The size of the hole 15 can be adjusted for different kinds of dispensing by sliding the valve-cover 3 up and down. The valve-cover 3 slides up for a bigger hole to dispense bigger size of pet food. The valve-cover 3 slides down for smaller hole to dispense smaller size of pet food.

In a pre-arranged time, the electrical timer 5 turns on the electrical power supply by connecting the electrical terminals 1 to 6 and 2 to 50 where 1 and 2 are the power source. As soon as the power is turned on, the vibrator 40 starts to vibrate because the push button 52 of the three-way micro-switch 16 is depressed by the measuring arm 8. At this point, the three-way micro-switch 16 is connecting terminals 50 to 20. The vibrator 40 is energized. There is a permanent magnetic flat bar 11 on top of the iron core 14 with a permanently fixed magnetic polarity and a fixed distance from the iron core 14. The permanent magnetic flat bar 11 can only be moved on top of the iron core 14 and parallel to the iron core 14. When the A/C voltage is applied to the electrical coil wrapped around the iron core 14, the said iron core has become a magnetic core with magnetic force in an oscillated manner by changing its magnetic polarity continuously. The oscillation of the magnetic polarity from the magnetic core 14 drives the permanent magnetic flat bar 11 back and forth parallel to the magnetic core 14. This movement creates vibration to dispense pet food out from the hole 15, through the ramp 9 and then drop to the catching bowl 10.

Pet food in the bowl 10 actually is on a scale to be weighed. The scale in the present invention is composed of a weighing pan 12 which is also function as the bottom piece of the catching bowl 10, a fulcrum 13 which is a knife edge v-shape pivot seats to hold up the scale, a measuring arm 8 which is made of a straight beam containing precise numerical numbers referring to the real weights on scale, and a poise 7 which can be slid along the measuring beam to set the desired weight of pet food to be dispensed. The further poise 7 is away from the fulcrum 13, the more pet food that will be dispensed. Otherwise, less pet food is dispensed when the poise closer to the fulcrum 13.

The weighing pan 12 holds up pet food in the catching bowl 10 until it is finally released. When the weighing pan 12 is separated from the catch bowl 10, the pet food in the bowl 10 will be unloaded downward. The unloading process takes place when the catching bowl 10 has enough pet food to match the set quantity to be dispensed. At this point, the pushing button 52 of the three-way micro-switch 16 is released from depressing by the measuring beam 8. The release of the push button 52 turns off the vibrator 40. The pet food ceases to come out of the storage container 18 to the catching bowl 10. The release of the push button 52 simultaneously turns on a gear-box or a solenoid coil 4 to activate the pushing rod 32 to push the measuring beam 8 upward in order to move the weighing pan 12 further down from the catching bowl 10. As the bottom piece 12 of the catching bowl 10 is separated wider from the catching bowl 10, the pet food in the bowl 10 is released to be served.

The small units of present invention may not have enough weight to press down the push button 52, therefore the pushing button 52 of the three-way micro-switch 16 can be substituted by the non weight activated magnetic switch or a proximity sensor. Button 52 is installed in a fixed position with a magnetic switch or a proximity sensor instead of a push button. The function for the three-way micro-switch 16 and its pushing button 52 remains function the same as mentioned, with one exception that the button 52 is not longer required to have physical contact with the measuring arm 8. When the measuring beam 8 is resting on the nearest position to the button 52, terminal 50 is connected to terminal 20 to energize the vibrator 40. Instead, when the measuring beam 8 slightly goes up from button 52, the terminal 50 is connected to terminal 30 to energize the pushing rod 32. The magnetic switch or a proximity sensor is able to switch power from the vibrator 40 to the pushing rod 32 by the movement of the measuring beam 8 whether it is close or away from button 52.

The timer 5 is working at all time, it turns on and turns off electrical power on the set schedule. When the timer turns off electrical power, all the above mentioned electrical components are de-energized, The bowl 10 is emptied and the weighing pan 12 goes back up to the bottom of the catching bowl 10 and the next cycle can be started as soon as the timer 5 turns on the electrical power supply again.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A pet food dispensing apparatus comprising:
   a) a storage container, having a side and a base, for holding pet food; said storage container having an adjustable hole in said side above and near said base;
   b) a downward sloping ramp; said downward sloping ramp having a proximal end and a distal end; said proximal end affixed to said storage container below said adjustable hole;
   c) a catch bowl positioned below said distal end and adjacent said storage container; said catch bowl having no bottom;
   d) an adjustable scale below said catch bowl; said adjustable scale having a weighing pan, a fulcrum, a measuring arm and a poise; said weighing pan being directly below said catch bowl;
   e) an electrical vibrator attached to said storage container;
   f) an activator near said fulcrum and below said measuring arm; said activator, when energized, pushing said weighing arm up; wherein said catch bowl and weighing pan are moved from a position in contact with each other to a position separated from each other;
   g) a three way switch further from said fulcrum and below said measuring arm; said three way switch energizing said vibrator when said measuring arm is close to said three way switch and said three way switch energizing said activator when said measuring arm is not close to said three way switch; and
   h) an electrical timer providing electrical current to said three way switch at a preset time for a preset interval.

2. A pet food dispenser as claimed in claim 1 in which said three way switch is mechanically activated.

3. A pet food dispenser as claimed in claim 1 in which said three way switch is magnetically activated.

4. A pet food dispenser as claimed in claim 1 in which said three way switch is proximity activated.

* * * * *